(12) United States Patent
Wu et al.

(10) Patent No.: US 6,661,577 B1
(45) Date of Patent: Dec. 9, 2003

(54) WAVELENGTH-SELECTIVE LASER BEAM SPLITTER

(75) Inventors: Li Wu, Fuxing Investment District (CN); Yinglong Lin, Fuxing Investment District (CN)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/244,631

(22) Filed: Sep. 17, 2002

(51) Int. Cl.[7] .................. G02B 27/10; G02B 27/28; G02B 27/12; G02B 5/30

(52) U.S. Cl. .................. 359/619; 359/640; 359/494; 359/496

(58) Field of Search .................. 359/618, 640, 359/494, 495, 496, 485

(56) References Cited

U.S. PATENT DOCUMENTS

| | | | | |
|---|---|---|---|---|
| 4,822,151 A | * | 4/1989 | Tatsuno et al. | 359/495 |
| 6,049,426 A | * | 4/2000 | Xie et al. | 359/484 |
| 6,236,507 B1 | * | 5/2001 | Hill et al. | 359/494 |
| 6,587,267 B2 | * | 7/2003 | Tai et al. | 359/484 |

* cited by examiner

Primary Examiner—Ricky Mack
(74) Attorney, Agent, or Firm—Allen, Dyer, Doppelt, Milbrath & Gilchrist, P.A.

(57) ABSTRACT

A beam splitting device for laser field is useful to spatially separate a laser beam created in the process of frequency doubling or three-wave mixing, into sub-beams according to wavelength and polarization state. The device has an optical retarder for wavelength-selective polarization rotation of the laser light, followed by a Wollaston prism and optionally a dual wedge prism to create parallel spatially separated sub-beams. Alternatively, two Wollaston prisms can be arranged to create two parallel spatially separated beams after the polarization rotation.

12 Claims, 2 Drawing Sheets

WAVELENGTH-SELECTIVE LASER BEAM SPLITTER

RELATED APPLICATIONS

None

1. Field of the Invention

The present invention relates to the field of optics and in particular to beam splitting devices, based on nonlinear effects.

2. Background of the Invention

It is known that a laser beam, while typically monochromatic, can include two or more than two frequencies or frequency peaks as a result of frequency doubling or three-wave mixing in a nonlinear medium having a second order nonlinearity. In such a case, it is often desirable to separate the beam into two or more components with different frequencies. Conventionally, an optical filter can be employed to pass one wavelength and reflect the other wavelength(s). Alternatively, dispersive prisms can be used to separate a laser beam containing two or more frequencies using the fact that various wavelengths of light undergo refraction at different angles. However, the first approach entails loss of light energy, and dispersive prisms are characterized by a large angle of refraction and a long length is required to resolve the two beams, which is inconvenient in practice. The present invention aims at alleviating at least some disadvantages of the prior designs.

The above-mentioned frequency changes in light frequency in the nonlinear medium can be explained in simple terms as follows:

A laser beam incident on a nonlinear medium will produce another beam or beams with new frequencies output from the medium due to the nonlinear effect, which is known as frequency doubling or three-wave mixing. In this process, two photons with frequency $\omega 1$ and $\omega 2$ are annihilated to create simultaneously a third single photon of frequency $\omega 3$. This process is known as sum frequency generation. Conversely, one can talk about generating lower frequencies using the three-wave mixing process. The present application proposes a beam splitting device based on the research of the above nonlinear phenomena.

Frequency doubling is a phase-matched process that requires the momentum of the photons to be conserved. This is conventionally obtained by using a birefringent crystal having a second order nonlinearity and propagating the waves through the crystal as e-rays (extraordinary rays) or o-rays (ordinary rays). The directions for the e-rays and o-rays are advantageously chosen or the refractive indices of the o-ray and e-ray are temperature or pressure tuned so as to obtain the phase matching condition. There are three possible ways for combining the fundamental light waves, that is:

$$o^{(\omega)}+o^{(\omega)}, \quad e^{(\omega)}+e^{(\omega)}, \quad o^{(\omega)}+e^{(\omega)},$$

wherein "o" denotes the ordinary ray and "e" denotes the extraordinary ray.

Since polarized wave exists also at the doubled frequency, the three above combinations for the light waves at the fundamental frequency may likely result in the following possible combinations, respectively:

$$o^{(\omega)}+o^{(\omega)} \rightarrow o^{(2\omega)}, \quad o^{(\omega)}+o^{(\omega)} \rightarrow e^{(2\omega)}$$

$$e^{(\omega)}+e^{(\omega)} \rightarrow o^{(2\omega)}, \quad e^{(\omega)}+e^{(\omega)} \rightarrow e^{(2\omega)}$$

$$e^{(\omega)}+o^{(\omega)} \rightarrow o^{(2\omega)}, \quad e^{(\omega)}+o^{(\omega)} \rightarrow e^{(2\omega)}$$

However, those combinations where all the waves are either all o-rays or all e-rays are not useful since the phase-matching condition is not possible in birefringent crystals for these cases. Therefore, there are only four possible ways for frequency doubling, which can be classified according to their features as phase-matching of the $1^{st}$ kind (I) and the phase-matching of the $2^{nd}$ (II) kind. The I kind, since the polarized directions of the electrical vector of the interacting fundamental light waves are parallel, is also termed "parallel phase matching", while the II kkind is also termed "orthogonal phase matching" since the polarized directions of the electrical vector of the interacting fundamental light waves are mutually orthogonal.

In the process of frequency multiplying, various known optical techniques are used to separate the fundamental frequency light from the doubled frequency for the above-mentioned two kinds of phase-matching. The present invention, defined and described below, proposes a new and different approach.

As for the three-wave parametric processes, the device of the present invention can be used to obtain parallel separation of the light at the single frequency from the light at the idler frequency. As above, there are two possible types for phase-matching for these optical parametric processes. In this case the relationship between the waves at the pump light frequency, signal light frequency and idler light frequency are expressed as follows:

the I kind phase-matching $e \rightarrow o+o \quad o \rightarrow e+e$ the II kind phase-matching $e \rightarrow o+e \quad o \rightarrow o+e$ In summary, what is disclosed is an apparatus and methods for separating into two parallel beams, the created light frequency from the light at the fundamental frequency or the light at the idler frequency for either the process of frequency doubling or the parametric process of three-wave mixing using either I or II kind phase-matching.

SUMMARY OF THE INVENTION

According to the invention, there is provided a beam splitting device, useful for laser beam splitting, the device comprising:

a wavelength-selective polarization rotating means disposed in the path of a light beam having two or more wavelengths for imparting a different polarization direction to different wavelengths of the light beam thus forming two or more sub-beams of light, and means for spatially separating the sub-beams of light according to their polarization.

In one embodiment, the wavelength-selective means may be a half-waveplate.

In another embodiment, the wavelength-selective means may be an interleaver.

In one embodiment, the means for spatially separating comprise a walk-off crystal disposed to angularly separate the differently polarized sub-beams of light. In another embodiment, the spatially separating means may be a Wollaston prism.

In one embodiment, the device also comprises an optical element, or a plurality of optical elements, disposed in the path of the angularly separated sub-beams of light for directing the sub-beams on mutually parallel paths. The element may be a Wollaston prism, a beveled prism or an equivalent element.

In an embodiment of the invention, the means for spatially separating and the optical element for directing the sub-beams on parallel paths may be a walk-off crystal.

Turning back to the process of light parameter magnifying, the device of the invention can be utilized to realize parallel separation of a signal light beam and idler frequency light. The relationship of pump light, signal light and idler frequency light, encountered for instance in OPO (optical parametric oscillator) can be expressed as follows:

$$\text{phase-matching, 1}^{st} \text{ kind } e \rightarrow o + o \quad o \rightarrow e + e$$
$$\text{phase-matching, 2}^{nd} \text{ kind } e \rightarrow o + e \quad o \rightarrow o + e$$

In other words, it is possible to find suitable ways to resolve the signal light and fundamental frequency light or idler frequency lights into parallel beams either for the process of frequency multiplying and light parameter magnifying or for the $1^{st}$ and $2^{nd}$ type of phase matching.

BRIEF DESCRIPTION OF THE DRAWINGS

The invention will now be described in more detail in conjunction with the accompanying drawings in which.

DETAILED DESCRIPTION OF THE INVENTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
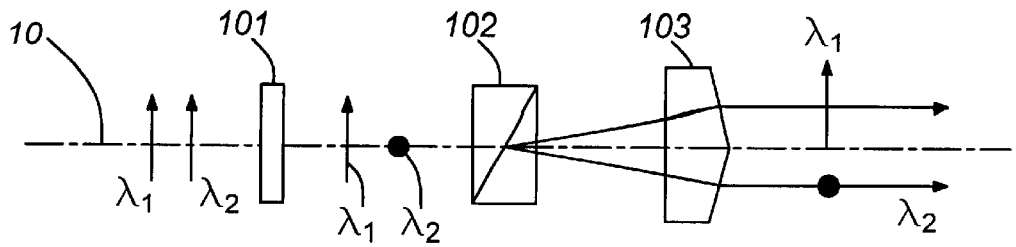
FIG. 1(a) is a schematic illustration of one embodiment of a beam splitting device of the invention wherein the polarization states of the input signal light beam, fundamental frequency light or idler frequency light beams are parallel but not separated after frequency doubling or three-wave mixing.

FIG. 1(a) shows one embodiment of a beam splitting device of the invention in the case that the output from the frequency doubling or three-wave mixing process is light at two wavelengths, $\lambda 1$ and $\lambda 2$, and the polarizations of the output signal light beam $\lambda 1$ and the fundamental frequency $\lambda 2$ or idler frequency beams are parallel after frequency doubling or the three-wave parametric mixing process. The multi-wavelength laser beam 10, containing light at wavelengths $\lambda 1$ and $\lambda 2$, is transmitted through a wavelength-selective waveplate 101, known in the art as an optical retarder. On emerging from the waveplate 101, the polarization of the light at one wavelength (e.g. $\lambda 1$) is unchanged (it is actually rotated through 180 degrees), whereas the polarization of the other wavelength ($\lambda 2$) is rotated by a certain degree, e.g. 90° so that its polarization is now orthogonal to the polarization of the light at $\lambda 1$.

After the light at wavelengths $\lambda 1$ and $\lambda 2$ passes through the waveplate 101, the light is incident on a Wollaston prism 102.

The Wollaston prism 102 is disposed in the path of the light beam output from the waveplate 101, separates angularly the beam into two sub-beams 12, 14 with different wavelength and different polarization states. Wollaston prisms are well known in the field of optics and do not require a detailed description here.

The spatially (angularly) separated sub-beams pass into a birefringent wedge prism 103. The prism may be designed as one piece or from two prisms glued together. The angles of the prism are selected such that the two sub-beams are refracted to exit the prism 103 as parallel or approximately parallel. The degree of precision of the angles in wedge controls the degree of parallelism of the exiting beams.

Figure 1B:
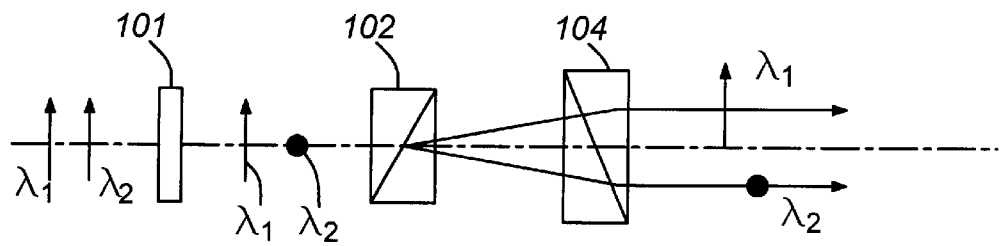
FIG. 1(b) is a schematic view of another embodiment of the present invention.

Another embodiment of the invention, shown in FIG. 1(b), functions in a similar manner as the device shown in FIG. 1(a), except that the spatial separation of the two sub-beams is achieved by two Wollaston prisms 102, 104. The prism 102 angularly separates the sub-beams and the prism 104 directs them into parallel paths. Notably, this arrangement has the capability to resolve the optical signals for the purposes of an optical parametric oscillator.

Figure 2:
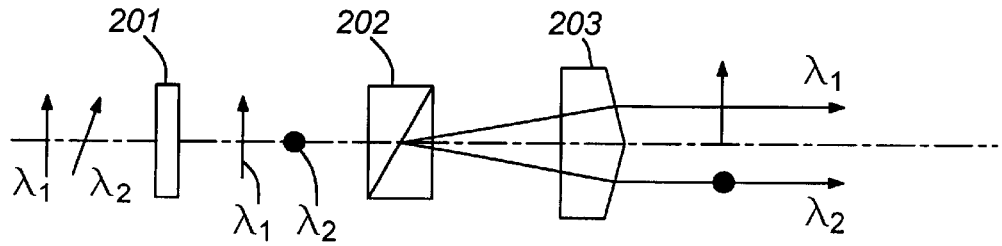
FIG. 2 is schematic view of an embodiment similar to that of FIG. 1(b) wherein an angle exists between the polarized states of the input signal beam and fundamental frequency light or idler frequency light after frequency doubling or three-wave mixing.

Next consider the case of frequency doubling or three-wave mixing, in which there is a certain angle between the polarized states of the output signal light beam $\lambda 2$ and fundamental frequency light $\lambda 1$ or idler frequency light as shown in FIG. 2. The waveplate 201 differs from the waveplate 101 of FIG. 1(a). When the multi-wavelength light beam passes through the waveplate 201, the polarized state of the light at wavelength $\lambda 1$ is unchanged, but polarization of the light at wavelength $\lambda 2$ is rotated by an angle, different than 90°, which makes the polarizations the light at wavelengths $\lambda 1$ and $\lambda 2$ orthogonal. Employing similar optical principles as those shown in FIG. 1(a), it is possible to design the elements to make the output sub-beams parallel. Of course, if desired, the output light beams can also be left non-parallel, e.g. angularly separated, subject to requirements of the optical system.

Figure 3:
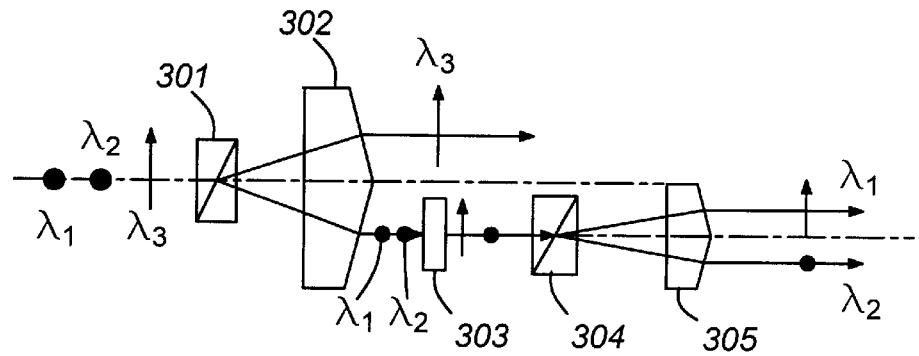
FIG. 3 shows still another embodiment of the beam splitting device.

The above mentioned embodiments disclose the details of the beam splitting device (as shown in FIG. 2 and FIGS. 1a and 1b) provided by the present invention in order to separate two beams of different wavelength. However, in the practical application of three-wave mixing, or in optical parametric oscillators, there are not just simply two beams, but three different wavelengths, for example, the pump light, the signal light and the idler light. If it is desirable to separate the three wavelengths efficiently, a compound beam splitting device as shown in FIG. 3 is required. The compound device will operate with either type 1 or type 2 phase-matching; it is only necessary to choose the waveplate 303 properly so that the light beams at wavelengths $\lambda 1$ and $\lambda 2$ emerging from the waveplate 303 are orthogonally polarized. Thus we can obtain the splitting of the light into three parallel beams having wavelengths $\lambda 1$, $\lambda 2$ and $\lambda 3$ as shown in FIG. 3.

In the case of either type I or type II phase-matching, there is always light at one wavelength that has a polarization that is orthogonal to the polarizations of the light at the other two wavelengths. The Wollaston prism 301 separates the three beams according to their different input polarized state. Consequently, the light at wavelength $\lambda 3$ is separated away from the other light at wavelengths state $\lambda 1$ and $\lambda 2$ which have similar polarization. The light with the same polarized state and wavelengths $\lambda 1$ and $\lambda 2$ is transmitted through birefringent wedge 302 and then the waveplate 303 that performs the same functions as waveplate 101 in FIG 1(a). That is, polarization of the light at wavelength $\lambda 1$ is rotated by 90 degrees and the polarization of the light at wavelength $\lambda 2$ is unchanged. The light at wavelengths $\lambda 1$ and $\lambda 2$ then passes through the Wollaston prism 304 and is separated by a certain degree before passing through a birefringent wedge 305, from which the separated beams emerge as parallel beams. Thus the device in FIG. 3 can be used to separate the light from the nonlinear three-wave mixing device into three parallel beams having wavelengths $\lambda 1$, $\lambda 2$ and $\lambda 3$ respectively.

It is apparent from the above analysis that the new beam splitting device provided by the present invention can not only be used for light generated in the frequency doubling process or the three-wave mixing process, but can also be used in other nonlinear processes such as sum frequency generation, difference frequency generation, third harmonic frequency generation and fourth harmonic frequency generation. The device provided by the present invention may efficiently separate the fundamental frequency light and light generated at the other frequencies and output them as parallel beams. The device can also be incorporated with a resonant cavity as shown in FIG. 4 in order to increase the efficiency of the nonlinear frequency conversion processes.

Figure 4:
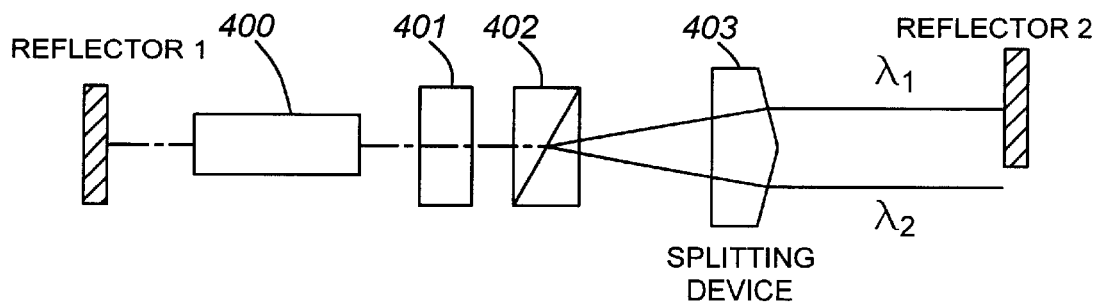
FIG. 4 is a schematic illustration of yet another embodiment of the device.

In FIG. 4, disposed between reflector 1 and reflector 2 of a laser cavity are a laser medium (any known laser medium) 400, a non-linear element 401, a Wollaston prism 402 and a birefringent wedge 403. The arrangement serves to provide the oscillation of the fundamental wavelength $\lambda 1$ and to couple out of the laser cavity the doubled frequency $\lambda 2$ which is generated in the non-linear element 401.

In addition, the function of the combination of a waveplate 101 and a Wollaston prism 102 in FIGS. 1a and 1b (or the equivalent corresponding elements 201 and 202, 303 and 304 in FIGS. 2 and 3) for separating light at different wavelengths into parallel beams as disclosed in the present invention can also be realized by using the optical principles underlying a crystal interleaver that separates a light wave containing several wavelength channels into two light waves with one containing the even channels and the other the odd channels. When the optical axis of the birefringent element in the interleaver is at an angle of 45 degree with respect to the polarization direction of the incident light, the birefringent element acts as a half waveplate for some wavelength channels (such as odd channels) and the direction of the light polarization for these channels is rotated by 45 degree, which is orthogonal to the original polarization direction.

Figure 5:
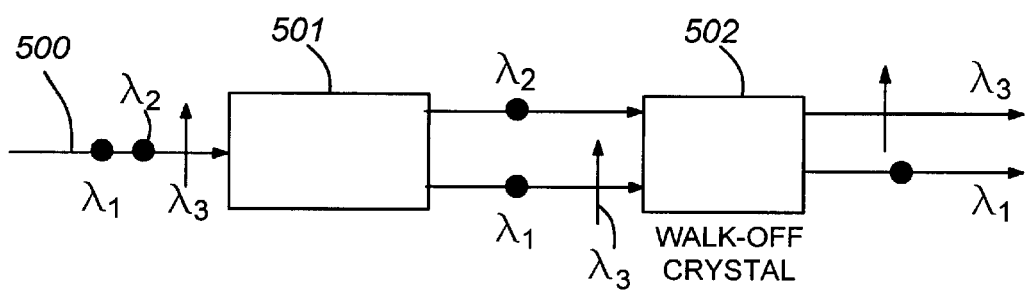
FIG. 5 illustrates an exemplary arrangement of the invention using an interleaver for separating different wavelengths of the laser beam.

On the other hand, the birefringent element acts as a waveplate for some other wavelength channels (such as even channels) and the direction of the light polarization of these channels will remain the same as the original polarization direction. Thus the odd and even channels are separated into two beams of orthogonal polarization state, if the light in the incident beam has the same polarization state for all wavelengths. The process is applied in FIG. 5, for the case of nonlinear optical parametric process that generates the three wavelengths $\lambda 1$, $\lambda 2$, and $\lambda 3$ in which the polarization of the light at wavelength $\lambda 3$ is orthogonal. The interleaver 501 is designed to separate the odd channels $\lambda 1$ and $\lambda 3$ from the even channel $\lambda 2$ of the input beam 500. A birefringent walk-off crystal 502 is then used to separate the light at wavelength $\lambda 1$ from the light at wavelength $\lambda 3$ thereby giving three separate beams of wavelengths $\lambda 1$, $\lambda 2$, and $\lambda 3$ respectively.

The advantage of using an interleaver to split the beams is that it can split the beams over a wider bandwidth than the combination of a waveplate and a Wollaston prism. However, in a practical application, it may be necessary to use bandpass filter with the splitting device described herein to separate the beams efficiently.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A laser beam splitting device for spatially separating a laser light beam having two or more wavelengths, the device comprising:

a wavelength-selective polarization rotating means disposed in the path of the laser light beam having two or more wavelengths for imparting a different polarization direction to different wavelengths of the light beam thus forming two or more sub-beams of light having a different polarization characteristics, and a means disposed in the path of the sub-beams of light for spatially separating the sub-beams of light according to their polarization characteristics.

2. The device of claim 1 further comprising directional means disposed to receive the spatially separated sub-beams and to direct them into spatially separated substantially parallel paths.

3. The device of claim 1 wherein the wavelength-selective means is a wavelength-specific half-waveplate.

4. The device of claim 1 wherein the wavelength-selective means is an interleaver.

5. The device of claim 1 wherein the means for spatially separating the sub-beams comprise a walk-off crystal disposed to angularly separate the differently polarized sub-beams of light.

6. The device of claim 1 wherein the spatially separating means is a Wollaston prism.

7. The device of claim 1 wherein the spatially separating means is a walk-off crystal.

8. The device of claim 4 wherein the spatially separating means is a walk-off crystal.

9. The device of claim 2 wherein the directional means is a Wollaston prism.

10. The device of claim 2 wherein the directional means is a dual wedge prism.

11. The device of claim 1 wherein the wavelength-selective polarization rotating means is selected to correct for an angle between polarization states of the laser light beam.

12. A device of claim 1 wherein the laser light beam comprises two or more wavelengths of which at least one has a different polarization state than another wavelength, the device comprising, before the wavelength-selective polarization rotating means, a means for separating the laser light beam into sub-beams having each one polarization state, such that a selected sub-beam with two or more wavelengths and one polarization state is directed to the wavelength-selective polarization rotating means.

* * * * *